Feb. 23, 1937. L. OBER 2,071,705
APPARATUS FOR INDICATING AND RECORDING WEIGHING OPERATIONS
Filed July 13, 1934 4 Sheets-Sheet 1
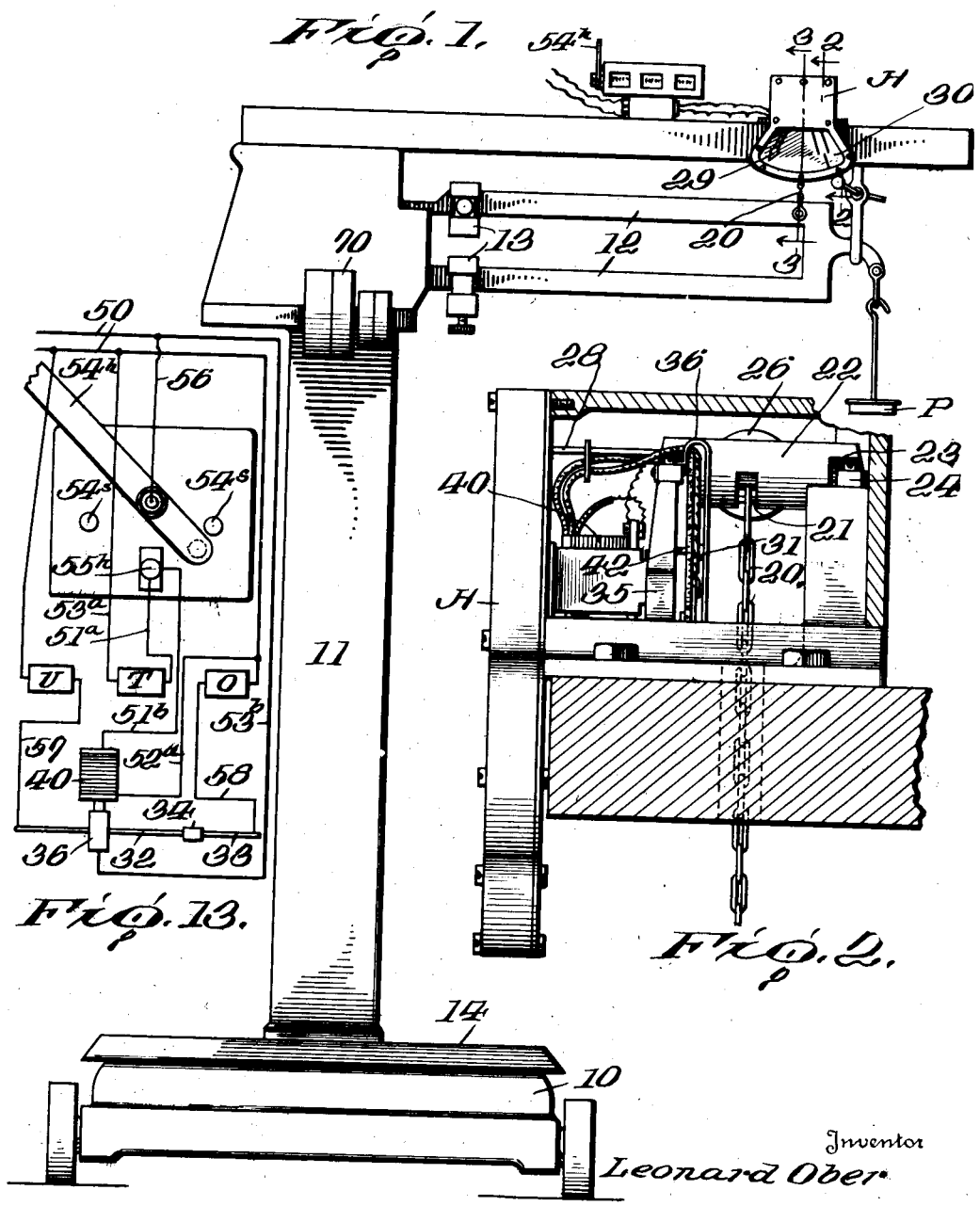

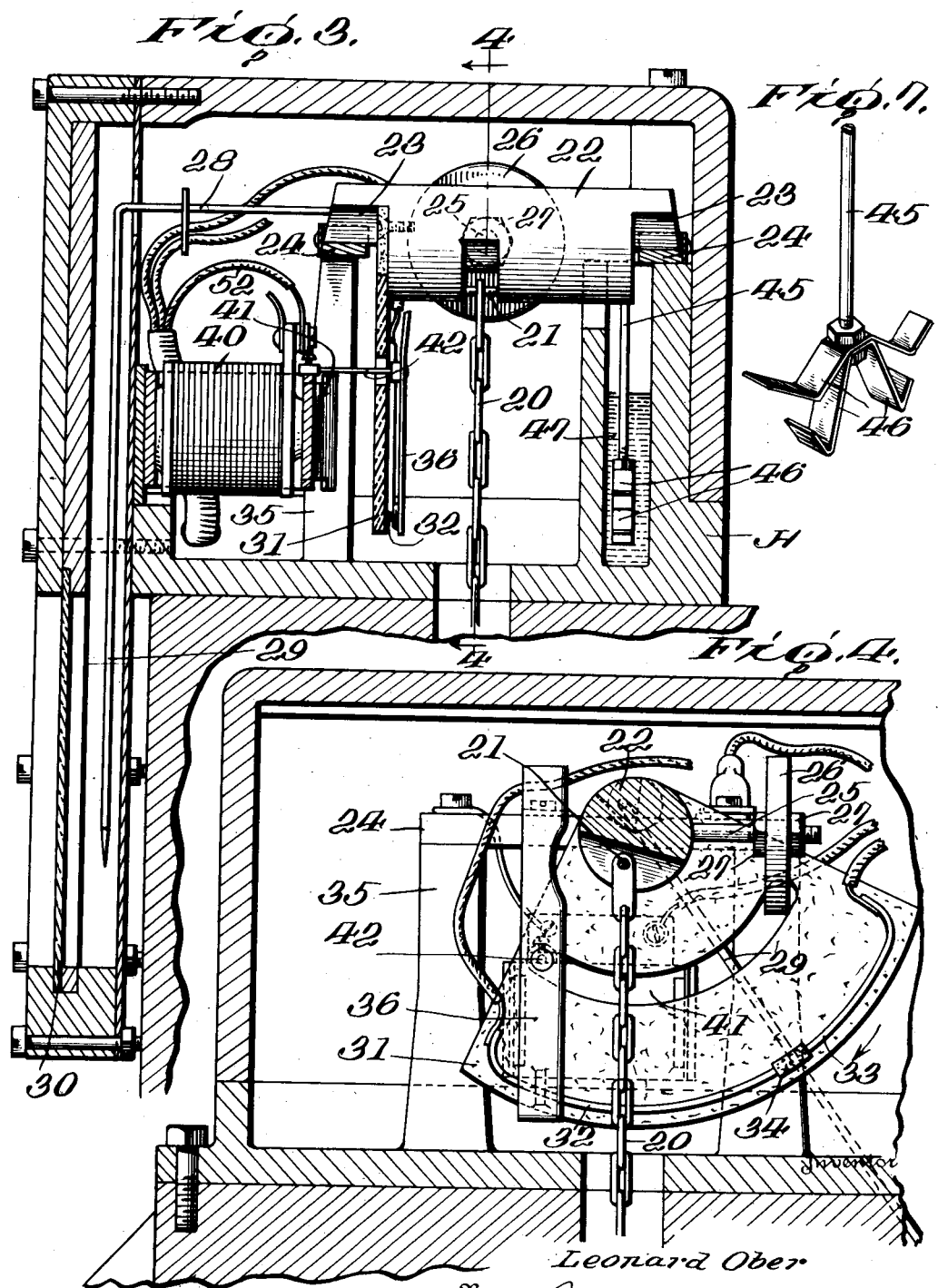

Feb. 23, 1937. L. OBER 2,071,705
APPARATUS FOR INDICATING AND RECORDING WEIGHING OPERATIONS
Filed July 13, 1934 4 Sheets-Sheet 3
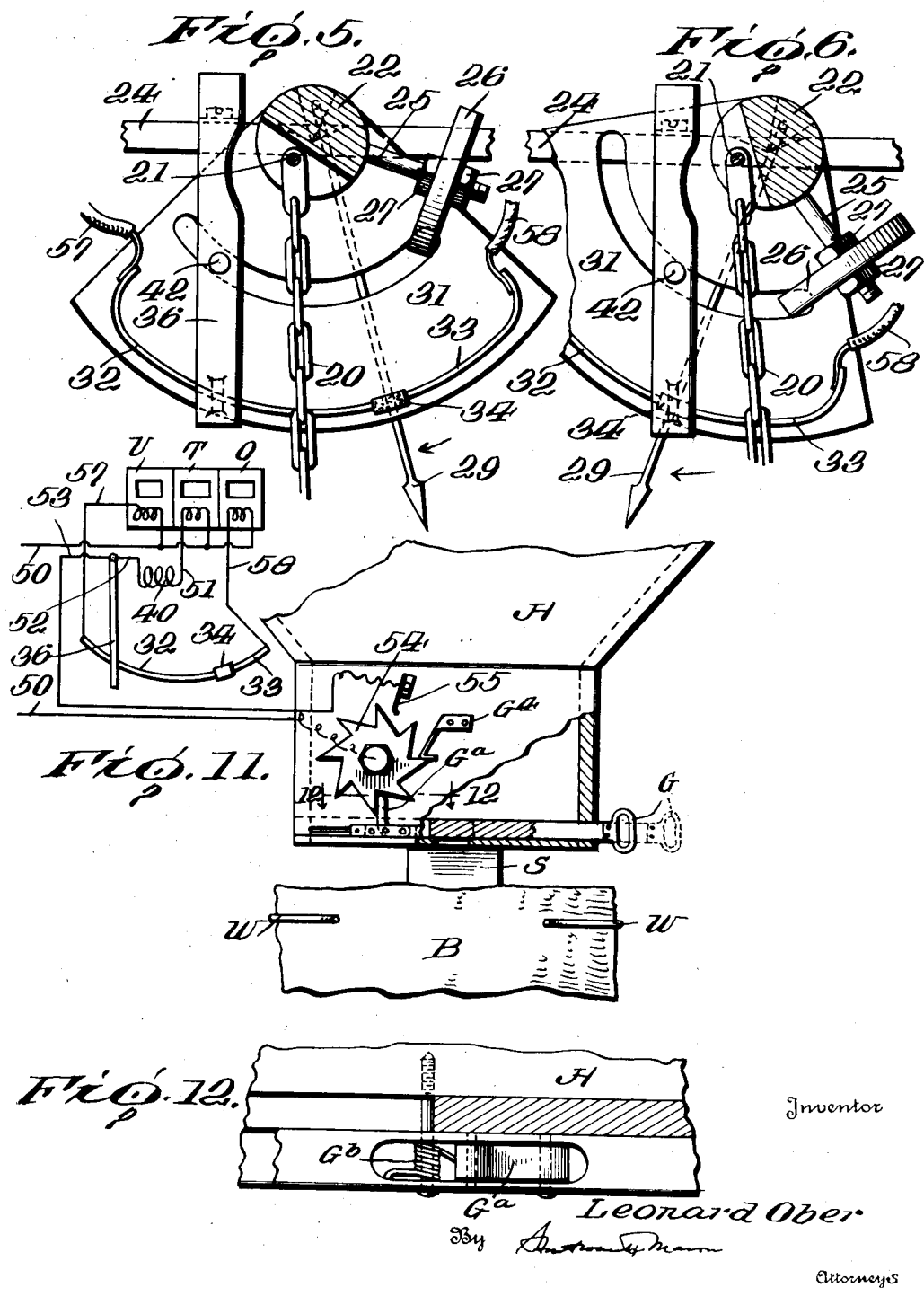
Inventor
Leonard Ober
By
Attorneys

Inventor
Leonard Ober

Patented Feb. 23, 1937

2,071,705

UNITED STATES PATENT OFFICE 2,071,705

APPARATUS FOR INDICATING AND RECORDING WEIGHING OPERATIONS

Leonard Ober, Baltimore, Md., assignor, by mesne assignments, to Controlled Weights, Inc., Baltimore, Md., a corporation of Maryland Application July 13, 1934, Serial No. 735,062

8 Claims. (Cl. 265—5)

The present invention relates to apparatus for indicating and recording weighing operations on bulk materials, in which a definite predetermined quantity is to be weighed out successively, provision of means for enabling the operator to observe the approach of the quantity to the predetermined weight with great accuracy, and permitting a recordation of the accuracy of the operator's work for reference by the superintendent.

One of the features of the present invention is the provision of means associated with a weighing device by which a movement of major extent is accomplished at substantially the pre-set standard weight, so that a high degree of accuracy is possible in the control.

Another feature of the present invention is the arrangement of such a device, that an approach to the pre-set quantity by weight accomplishes a small movement, to indicate to the operator that the pre-set quantity is nearly attained; followed by a movement of greater and greater magnitude as the pre-set quantity is more closely approached.

A further feature of the present invention is the coordination with a weighing mechanism of means for indicating the fact that the pre-set quantity by weight has been attained, along with further means by which a departure from this quantity may be employed to make a record of the fact that the particular weighing operation has resulted in an "over" or "under" with respect to a working tolerance including the standard or exact predetermined weight, so that the superintendent may determine the accuracy and efficiency of the particular operator's work, and an inspector may determine whether departures from accuracy are in favor of or against the company, or whether such departures balance one another.

Other features of the invention will appear in the course of the following specification and claims, in conjunction with the illustrative examples of practice set out on the accompanying drawings, in which:

Figure 1 is a general view showing a weighing scale having a device of the present nature therewith to furnish a weighing apparatus of the present character.

Figure 2 is a sectional view on a larger scale, substantially on line 2—2 of Figure 1.

Figure 3 is a similar sectional view, on a larger scale, on line 3—3 of Figure 1.

Figure 4 is a sectional view substantially on line 4—4 of Figure 3.

Figures 5 and 6 are views corresponding to a portion of Figure 4, showing the parts in different operative positions.

Figure 7 is a perspective view of a dashpot structure as employed in Figure 3.

Figure 8 is a view corresponding to that of Figure 3, showing a modified form of the structure.

Figure 9 is a fragmentary detail view, substantially on the line 9—9 of Figure 8.

Figure 10 is a view showing a portion of the structure in Figure 8, in a different operative position.

Figure 11 is a side view of a filling mechanism employed in conjunction with the structure of Figure 1, and a circuit control device associated therewith.

Figure 12 is a detail sectional view substantially on line 12—12 of Figure 11.

Figure 13 is a circuit diagram of a further type of control system.

In the drawings, a platform scale having a base 10, a column 11 and weighing beams 12 is of the usual construction, operating in conjunction with the sliding weights 13 on the beams 12 to determine the weight of material upon platform 14 which is connected in the usual way to the scale beams 12. In the normal operation of such a scale, a bag B (Fig. 11) may be placed upon the platform 14 and filled from a hopper A through a spout S when a gate G is in the dotted position of Figure 11, until the bulk material in the bag B establishes a balance at the scale beams 12 so that the right-hand end of these beams rises, and then the gate G is moved to the closed position (full lines, Fig. 11).

According to the present invention, the scale beams 12 are connected to a chain 20 which is joined to a pin 21 eccentrically mounted in a notch of the turning bar 22 which rests by knife edges 23 upon fixed supports 24. An arm 25 extends from the turning bar 22 and is threaded to receive a counter-weight 26 which may be secured in adjusted position by the lock nuts 27 (Fig. 4). The turning bar 22 also has an extension 28 with a downwardly turned end 29 which provides a pointer which is visible through a glass window 30 in the lower part of the general housing H.

The turning bar 22 is also provided with a sector 31 of insulating material having a multiple contact arc secured thereon illustrated as formed of two contactors 32 and 33 whose ends are separated and covered by an insulating "dead spot" 34 having a length along the arc corresponding to the range of tolerance which is allowable in the weighing operation, and including the standard or predetermined weight to be weighed out.

The standards 35 (Figs. 2 and 3) within the housing H have a bridge 24 which carries one of the knife edge plates and also the end of a resilient contactor 36 which extends downwardly across the face of the sector 31 and the arcuate contactors 32 and 33 thereon (Fig. 4).

Within the housing is a solenoid 40 provided with a pivoted armature 41 which is connected by a link 42 with the contactor 36, extending through an arcuate slot in the sector 31.

The turning bar 22 is further provided with an arm 45 (Figs. 3 and 7) having a plurality of paddles 46 on its lower end extending into a pocket 47 of the housing H, which is filled with liquid, so that the structure operates as a dashpot for dampening the movements of the turning bar 22 and preventing vibration thereof.

The torque exerted on the turning bar 22 by the counter-weight 26 would cause the scale beams 12 to rise when the platform 14 is unloaded, and the sliding weights 13 are at zero, and no weights are on the pan P (Fig. 1); but this is compensated by the use of a small weight on the pan P, and a balance is attained with this small weight, in the zero condition, so that a slight added weight upon the platform 14 will move the beams 12; and so that a slight increment of weight upon the platform 14, when the pre-set quantity by weight is approached, will likewise cause the full rising movement of the scale beams 12.

A source of electric energy such as the conductors 50 is connected to each of the three electromagnetically actuated counting mechanisms T, U and O, (Fig. 11) these mechanisms not being shown in detail as any appropriate type may be employed. One terminal of each solenoid is connected to a supply conductor 50. The conductor 51 from the solenoid of the "totals" counting device T connects it in series with the solenoid 40, and thence by a conductor 52 with the contactor 36 and also with a conductor 53 which is connected to a contact closing member 55. The cooperating contact member 55 of the latter is formed as a ratchet wheel and is joined to the other supply conductor 50. A stop pawl 64 prevents retrograde movement of the ratchet wheel 54. The solenoid of the "unders" counting device U is connected by conductor 57 with the arcuate contactor 32; while the solenoid of the "overs" counting device O is connected by conductor 58 with the arcuate contactor 33.

The operation of this form of the device is as follows: A bag B is supported by holders W (Fig. 11) upon the platform 14, and the gate G is opened so that bulk material flows from the hopper into the bag B. Prior to this time the quantity to be weighed has been pre-set by proper placing of weights 70 upon the pan P and by adjustment of the sliders 13, which are then locked in position. As the material enters the bag B, a quantity is finally attained which causes a slight initial rising movement of the scale beams 12. If the quantity to be weighed is say one hundred pounds, and the counter-balance 26 has been adjusted to give a torque equivalent to one pound upon the chain 20, this rising movement will begin at ninety-nine pounds. If the torque produced through the counter-weight 26 is of the order of four ounces, this rising will begin at ninety-nine pounds and twelve ounces. Thus, by adjustment of the counter-weight 26, the accuracy of determination may be varied according to the requirements of the particular operation.

As the beams 12 begin to rise, the chain 20 permits the turning bar 22 to turn in a clockwise direction (Figs. 4, 5 and 6) at a trigonometric ratio with respect to the actual ascending movement of the end of scale beams 12. This movement at first is slow, as a considerable rise of the beams 12 is required to permit a given angular movement of the turning bar 22, but the rate successively increases as the bar 22 turns and the pin 21 moves away from its position of rest. Thus, when the tentative balance begins at ninety-nine pounds (according to the first example above), and the scale beams 12 begin to rise, the finger 29 begins to move in a counter-clockwise direction in Figure 1 or clockwise direction in Figures 4–6. Markings are preferably provided for cooperation with the finger 29, as seen in Figure 1, so that the operator may determine the point when the pre-set quantity is closely approached, the lower mark in Figure 1 indicating exactly the pre-set quantity. Normally in operation, the operator will push the gate G toward the left as this tentative balance is approached, thus restricting the flow to a lesser volume per unit of time, and will continue the closing movement of the gate so that smaller and smaller increments of weight are added. Simultaneously therewith the trigonometric relationship of the movement of the turning bar 22 to the rising of the scale beams 12 causes the successive increments of like weight to have a greater and greater effect in producing movement of the finger 29. Normally, the gate G will have been completely closed when the finger designates the lower mark in Figure 1. A weighing operation has now been completed and the bag contains exactly the preset quantity desired.

The operator may now continue the leftward movement of the gate G until the finger Ga on this gate engages the ratchet wheel 54 and moves this member through an angular distance equivalent to one tooth. This results in a momentary closing of the circuits between conductors 50. Current flows from a conductor 50 through the solenoid of the counting device T, conductor 51, solenoid 40, conductors 52 and 53, contactor 55, ratchet 54, and back to the other supply conductor 50. The counting device T is energized to indicate that one weighing operation has occurred. The solenoid 40 attracts its armature 41 and draws the contactor 36 inwardly. If the preset weight has been attained with prescribed limits, the conductor 50 encounters the "dead spot" 34 and no further circuit is established. If the quantity in the bag is too small, the contactor 36 is drawn down upon the arcuate contactor 32 so that current also flows from one conductor 50 through the solenoid of the "unders" counter U and thence by conductor 57 to arcuate contactor 32, contactor 36, conductor 53, contactor 55, the cooperating ratchet wheel 54, and to the other supply conductor 50, resulting also in a counting operation of the "unders" counting device U. On the other hand, if the operator has permitted too great a quantity of material to flow into bag B, a circuit is established from one conductor 50 through the solenoid of the "overs" counting device O, and thence by conductor 58, arcuate contactor 33, contactor 36, conductor 53, contactor 55, ratchet wheel 54 and back to the other supply conductor 50; resulting in a counting operation in the "overs" counting device O.

It will be noted that the actuation of the ratchet 54 is momentary only, and that the two counting operations occur substantially simultaneously and the circuit is immediately interrupted by the continued rotative movement of the ratchet 54, into the position shown in Figure 11.

The filled bag of material is removed, an empty bag substituted, and the gate G is moved for filling the new bag. During this new movement of the gate G, the spring pawl Ga yields downwardly against its spring Gb (Fig. 12), so that no action of the ratchet 54 occurs.

Figures 8, 9, 10:
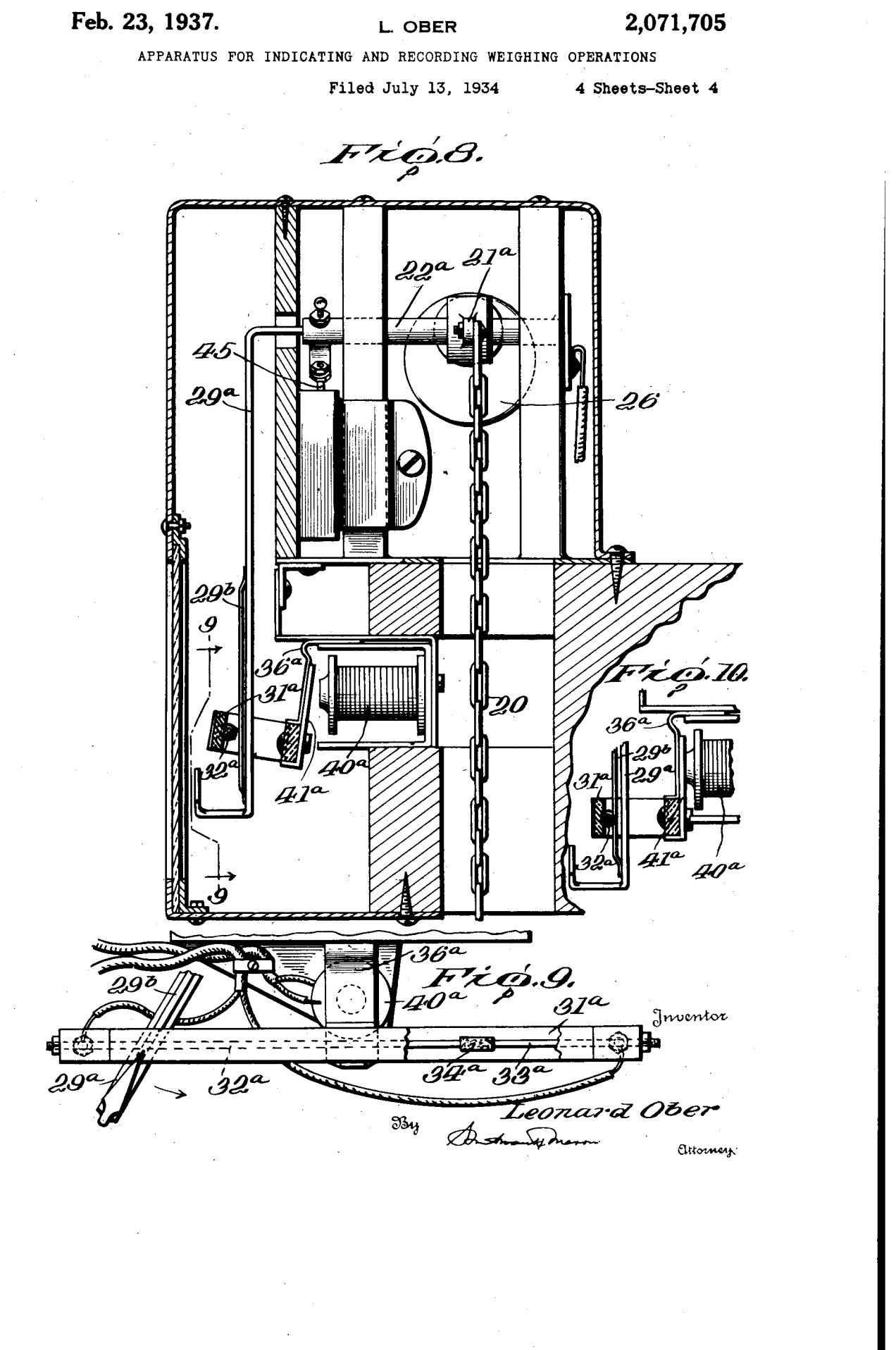

In the modified form of construction shown in Figure 8, the chain 20 is connected to a point on crank arm 21a which is eccentric to the rocking axis of the turning bar 22a, this bar having the indicating finger 29a thereon and being connected to a dashpot member 45, and having an arm with a counter-weight 26, as before.

In this form of the invention, the pointer 29a moves opposite a rocking contact structure comprising a resilient support 36a having mounted thereon the armature 41a of a solenoid 40a, and also having mounted thereon an insulating member 31a having contactors 32a and 33a fixed thereto and separated by an insulation piece 34a providing a "dead spot" as before. It is preferred to provide a separate contact piece 29b on the finger 29a. The same circuit arrangement may be employed. In Figure 8, the parts are shown with the solenoid 40a deenergized and the contacts open, while in Figure 10 the rocking contactor structure is shown in the closing position to which it is moved when the solenoid 40a is energized.

In the circuit arrangement of Figure 13, a manual circuit closer 54h is employed in lieu of the ratchet 54 and the cooperating contactor 55. The circuit closer 54h may be moved between the fixed stops 54s and when in its central position establishes circuit connections between the supply conductors 50. When in this central position, a totalizing circuit is closed from one supply conductor 50 by conductor 56, circuit closer 54h, contact 55h and by conductor 51a and the solenoid of the "totals" recording device T and thence back by a conductor 53a to the other supply conductor 50 energizing the "totals" recording device to show that one way has been accomplished. At the same time, a further circuit is established from contact 55h by conductor 51b to the solenoid 40 relative to energize the contactor member 36 and bring it upon the contact bars 32 or 33, or upon the insulation 34. If the pre-set weight has not been made up fully, contact member 36 closes a circuit from one supply conductor 50 by conductor 53b to the contact member 36, to the bar 32, by conductor 57 to the solenoid of the "unders" recording device and thence back to the other supply conductor 50. The "unders" recording device indicates that the particular weighing operation has not been accomplished by the attendant in a proper manner, and that the quantity weighed is insufficient. In a similar manner, when the quantity weighed out is too great, a circuit is established from the branch conductor 53b to the contactor 36, bar 33, conductor 58, through the solenoid of the "overs" recording device and thus back to the other supply conductor 50, resulting in a corresponding indication on the "overs" device.

In both examples of construction, it will be understood that the limit of movement of the contact-bearing sector 31 or of the needle 29a is such that a contact is made upon the bars 32 or 33, or the contact element is brought upon the dead spot 34. This is accomplished in the form shown in Figures 1 to 7 by the limiting effect of the link 42 in the slot 41, for example, while in the form of Figures 8 to 10, the indicator finger 29a is limited by the end portions which support the insulating rocker bar 31a. It will be understood, further, that the range of movement afforded to the sector 31 or to the indicating finger 29a is determined by the possible movement of chain 20 as the beams 12 move from the lower to the upper position; and the dimensions are calculated so that the aforesaid contact is assured at the limit positions of the beams 12.

It is obvious that the invention may be employed in other ways, and that no limitation therein is imposed within the scope of the appended claims.

Having thus described the invention, what I claim as new and desire to secure by Letters Patent, is:

1. The combination with a weighing device, of means actuated when an increasing load on the weighing device approaches a predetermined amount and operating to give an amplified indication of the approach of the load to said predetermined amount, fixed contact means, contact means moved with said actuated means and cooperative with the fixed contact means for circuit closing, one said contact means having individual contacts separated by insulation from one another at a point corresponding to the indication of said predetermined amount, the other said contact means having a lesser width than the corresponding dimension of said insulation, means operative for recording the total number of weighing operations, and separate circuits each including one of said individual contacts and each including a separate recording device for recording whether the load at each said weighing operation is over or under a predetermined range of tolerance including said amount, said insulation being effective to prevent operation of said separate recording devices when the load is within said predetermined range of tolerance.

2. The combination with a weighing scale having a weighing platform and a beam swinging between stops as a balance is reached, of means for discharging bulk material for the weighing out of a load of predetermined amount upon said platform, a contact structure moved by said beam as it swings, counter-balance means cooperative with said contact structure for determining the balance at said amount, means for stopping said discharge for weighing out the load, circuit means including electrically energized recording devices selected according to the position of said contact structure and closed with said stopping means for recording whether the load recorded for said weighing operation is over or under a predetermined range of tolerance including said amount, means for preventing the closing of a circuit through said recording devices when the load is within said predetermined range of tolerance, and a totals recording device operated at each weighing operation independently of the actuation of the first said recording devices.

3 The combination with a weighing device, of a selective contact structure, means on the device for initiating a movement of said structure when a predetermined load is approached, a selective circuit closer structure cooperative with said contact structure, a totals counter actuated with said circuit closer structure, a pair of recording devices, and circuit means including said structures for energizing said recording devices, said structures including a dead spot so that no energization of either said recording device may occur when said device is indicating a load within a predetermined range of tolerance, and also including a contact at each side of said dead spot operative for the selective energizing of said recording devices to obtain separate totals of "overs" and "unders" with respect to said range of tolerance.

4. The combination with a weighing device having a scale beam, of a frame, a rocking bar on said frame, operating means connecting said beam and bar, a contact structure on said bar, a movable circuit closer structure on said frame, solenoid means for moving said movable structure, one of said structures including a plurality of contacts selectively engageable by the other structure according to the position of said bar, a plurality of electrically actuated recording devices, and means for actuating said recording devices including first circuit means connected to said contacts and recording devices and selectively closed by said structures for energizing said recording devices and including further circuit means for energizing said solenoid means to effect a closing of said first circuit means.

5. The combination with a weighing device having a scale beam movable between fixed spots as an increasing load to be weighed out approaches the predetermined standard weight, of a frame, a rocking bar on said frame operatively connected for movement by said scale beam, insulated contacts on said bar and selectively positioned thereby, insulation providing a dead spot between said contacts for establishing a range of tolerance including said predetermined weight, a circuit closer cooperative with the selected contact; recording devices including a totals counter, an "overs" counter, and an "unders" counter; an energizing means for said recording devices including individual selective circuits from said contacts for selectively actuating said "overs" and "unders" counters when the circuit closer is closed upon a corresponding said contact, said selective circuits remaining de-energized when the closer engages the said insulation, and also including devices for actuating the totals counter at each completed weighing operation regardless of whether a said contact is engaged or not.

6. The combination with a weighing device, of means actuated thereby and including a first contact structure, a second contact structure cooperative with said first structure and electrically energized means for moving the same to closed position, one said structure including a plurality of contacts selectively engageable by the other according to the load on said weighing device, a device for recording the total number of weighing operations, devices for recording separately the numbers of weighing operations over and under a predetermined range of tolerance, each said device including an electrically energized means for actuating the same, means for admitting a bulk material for weighing, and means coordinated with said admitting means and operated when the admitting means is closed for closing circuits through said energizing means to actuate said totals recording device and to actuate selectively said overs and unders recording devices according to the position of said one structure.

7 The combination with a weighing device, of a frame, a rocking bar on said frame, means connecting said weighing device to a point on said bar located substantially in the vertical plane through the axis of the bar when the load is below a predetermined fraction of the predetermined amount to be weighed out, an arm extending from said bar and a counterweight on said arm located substantially in the horizontal plane through the axis of the bar when the load is below said fraction, cooperative contact means on the frame and bar including a plurality of contacts selectively engageable accordingly as the load is over or under a range of tolerance including said amount, individual counting devices and selective actuating means therefore including circuit means extending through said contacts and contact means, said arrangement of the point and counterweight causing the torque arm of the counterweight to decrease and the torque arm at the point to increase as the load approaches said predetermined amount whereby to amplify the magnitude of movement of said bar and thus the sensitiveness of the selection of said contacts.

8. The combination with a weighing device, of a frame, a rocking bar, a counterweight arm connected rigidly to the bar for rocking the same in one direction, means operated by said weighing device after the load being weighed has come within a predetermined fraction of the predetermined amount to be weighed out and connected pivotally to said bar at an eccentric point thereof for rocking the bar in the other direction, the pivotal connection being located at a peripheral angle from the counterweight arm so that the rocking effort exerted by the arm is increased and the rocking effort exerted by the rocking means is decreased as the load increases toward said predetermined amount, cooperative contacts on the frame and bar including a plurality of separate contacts selectively engageable accordingly as the load is within a predetermined tolerance relative to said predetermined amount or over or under such tolerance, and means including circuits through said contacts for determining the said load.

LEONARD OBER.